US011212858B2

(12) United States Patent
Novlan et al.

(10) Patent No.: US 11,212,858 B2
(45) Date of Patent: *Dec. 28, 2021

(54) ON-DEMAND BACKHAUL LINK MANAGEMENT MEASUREMENTS FOR INTEGRATED ACCESS BACKHAUL FOR 5G OR OTHER NEXT GENERATION NETWORK

(71) Applicant: AT&T Intellectual Property I, L.P., Atlanta, GA (US)

(72) Inventors: Thomas Novlan, Cedar Park, TX (US); Arunabha Ghosh, Austin, TX (US); Salam Akoum, Austin, TX (US); Xiaoyi Wang, Austin, TX (US)

(73) Assignee: AT&T INTELLECTUAL PROPERTY I, L.P., Atlanta (GE)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,967

(22) Filed: Oct. 7, 2020

(65) Prior Publication Data

US 2021/0029765 A1    Jan. 28, 2021

Related U.S. Application Data

(63) Continuation of application No. 16/366,452, filed on Mar. 27, 2019, now Pat. No. 10,834,773.

(Continued)

(51) Int. Cl.
*H04W 76/15* (2018.01)
*H04W 24/10* (2009.01)
(Continued)

(52) U.S. Cl.
CPC ............ *H04W 76/15* (2018.02); *H04B 7/088* (2013.01); *H04W 24/10* (2013.01); *H04W 40/205* (2013.01); *H04W 56/003* (2013.01)

(58) Field of Classification Search
CPC ... H04W 24/10; H04W 16/28; H04W 56/001; H04W 56/003; H04W 76/15; H04W 56/0005

(Continued)

(56) References Cited

U.S. PATENT DOCUMENTS 9,961,605 B2    5/2018 Rost et al.
9,991,942 B2    6/2018 Onggosanusi et al.
(Continued)

FOREIGN PATENT DOCUMENTS

WO    2017/122977 A1    7/2017
WO    2019/110869 A1    6/2019

OTHER PUBLICATIONS

U.S. Appl. No. 16/366,452, filed Mar. 27, 2019.
(Continued)

*Primary Examiner* — Emmanuel Bayard
(74) *Attorney, Agent, or Firm* — Amin, Turocy & Watson, LLP

(57) ABSTRACT

The same or similar physical signals can be used for both user equipment (UE) and an integrate access backhaul (IAB) node. Different configurations of the resources and/or transmission periods of the signals can be used for initial access for access UEs and IAB nodes. In addition, to support topology formation, mobility/multi-connectivity procedures, and backhaul link management, periodic measurements and reports can be configured by a parent IAB node to a child IAB node UE function. This can comprise radio resource management (RRM), radio link monitoring (RLM), and beam management (L1-BM) measurements and reports.

20 Claims, 14 Drawing Sheets

Related U.S. Application Data

(60) Provisional application No. 62/738,563, filed on Sep. 28, 2018.

(51) Int. Cl.
*H04W 40/20* (2009.01)
*H04B 7/08* (2006.01)
*H04W 56/00* (2009.01)

(58) Field of Classification Search
USPC .................................. 375/262, 267, 299, 356
See application file for complete search history.

(56) References Cited

U.S. PATENT DOCUMENTS

| | | | |
|---|---|---|---|
| 10,834,773 B2* | 11/2020 | Novlan | H04B 7/0695 |
| 2013/0225188 A1 | 8/2013 | Seo et al. | |
| 2013/0315321 A1 | 11/2013 | Rajagopal et al. | |
| 2014/0321410 A1 | 10/2014 | Frederiksen et al. | |
| 2015/0036609 A1 | 2/2015 | Kim et al. | |
| 2016/0218847 A1 | 7/2016 | Zheng et al. | |
| 2016/0227501 A1* | 8/2016 | Shen | H04W 56/00 |
| 2017/0064731 A1 | 3/2017 | Wang et al. | |
| 2017/0311276 A1 | 10/2017 | Tsai et al. | |
| 2017/0332264 A1 | 11/2017 | Mo et al. | |
| 2018/0192412 A1 | 1/2018 | Novlan et al. | |
| 2018/0192443 A1 | 1/2018 | Novlan et al. | |
| 2018/0091272 A1 | 3/2018 | Wang et al. | |
| 2018/0092139 A1 | 3/2018 | Novlan et al. | |
| 2018/0092141 A1 | 3/2018 | Wei et al. | |
| 2018/0124718 A1 | 5/2018 | Ng et al. | |
| 2018/0146439 A1* | 5/2018 | Kim | H04W 52/322 |
| 2018/0279379 A1 | 9/2018 | Tsai et al. | |
| 2018/0302803 A1 | 10/2018 | Ramachandra et al. | |
| 2019/0053193 A1* | 2/2019 | Park | H04B 7/0617 |
| 2019/0090143 A1 | 3/2019 | Luo et al. | |
| 2019/0097776 A1* | 3/2019 | Kim | H04L 27/2611 |
| 2019/0230544 A1 | 7/2019 | Zhu et al. | |
| 2019/0230545 A1 | 7/2019 | Liou et al. | |
| 2019/0253127 A1 | 8/2019 | Kang et al. | |
| 2019/0297603 A1 | 9/2019 | Guo et al. | |

OTHER PUBLICATIONS

AT&T, et al., "New SID Proposal: Study on Integrated Access and Backhaul for NR" 8881123GPP TSG RAN Meeting #75, Dubrovnik, Croatia, Mar. 6-9, 2017, 5 pages.

Non-Final Office Action received for U.S. Appl. No. 16/366,452 dated Oct. 30, 2019, 37 pages.

International Search Report and Written Opinion received for PCT Application Serial No. PCT/US2019/047589 dated Nov. 4, 2019, 16 pages.

Lenovo et al., "Discussion on discovery and measurement for IAB network", 3GPP TSG RAN WG1 Meeting #94, R1-1808552, Aug. 20-24, 2018, 3 pages.

Huawei et al., "Physical layer design for NR IAB", 3GPP TSG RAN WGI Meeting #94, R1-1808101, Aug. 20-24, 2018, 14 pages.

Ericsson, "IAB physical layer enhancement for backhaul link management", 3GPP TSG-RAN WG1 Meeting #94, R1-1809231, Aug. 20-24, 2018, 8 pages.

Final Office Action received for U.S. Appl. No. 16/366,452 dated Apr. 9, 2020, 74 pages.

Notice of Allowance received for U.S. Appl. No. 16/366,452 dated Jul. 24, 2020, 64 pages.

International Preliminary Report on Patentability received for PCT Application Serial No. PCT/US2019/047589 dated Apr. 8, 2021, 8 pages.

\* cited by examiner

ON-DEMAND BACKHAUL LINK MANAGEMENT MEASUREMENTS FOR INTEGRATED ACCESS BACKHAUL FOR 5G OR OTHER NEXT GENERATION NETWORK

RELATED APPLICATIONS

This application is a continuation of, and claims priority to, U.S. patent application Ser. No. 16/366,452 (now U.S. Pat. No. 10,834,773), filed Mar. 27, 2019, and entitled "ON-DEMAND BACKHAUL LINK MANAGEMENT MEASUREMENTS FOR INTEGRATED ACCESS BACKHAUL FOR 5G OR OTHER NEXT GENERATION NETWORK," which non-provisional applications each claim the benefit of priority to U.S. Provisional Patent Application No. 62/738,563, filed Sep. 28, 2018 and titled "ON-DEMAND BACKHAUL LINK MANAGEMENT MEASUREMENTS FOR INTEGRATED ACCESS BACKHAUL FOR 5G OR OTHER NEXT GENERATION NETWORK," the entireties of which applications are hereby incorporated by reference herein.

TECHNICAL FIELD

This disclosure relates generally to facilitating on-demand backhaul link management and measurements. For example, this disclosure relates to facilitating on-demand backhaul link management measurements for integrated access backhaul for a 5G, or other next generation network.

BACKGROUND

5th generation (5G) wireless systems represent a next major phase of mobile telecommunications standards beyond the current telecommunications standards of 4$^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating on-demand backhaul link management and measurements is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
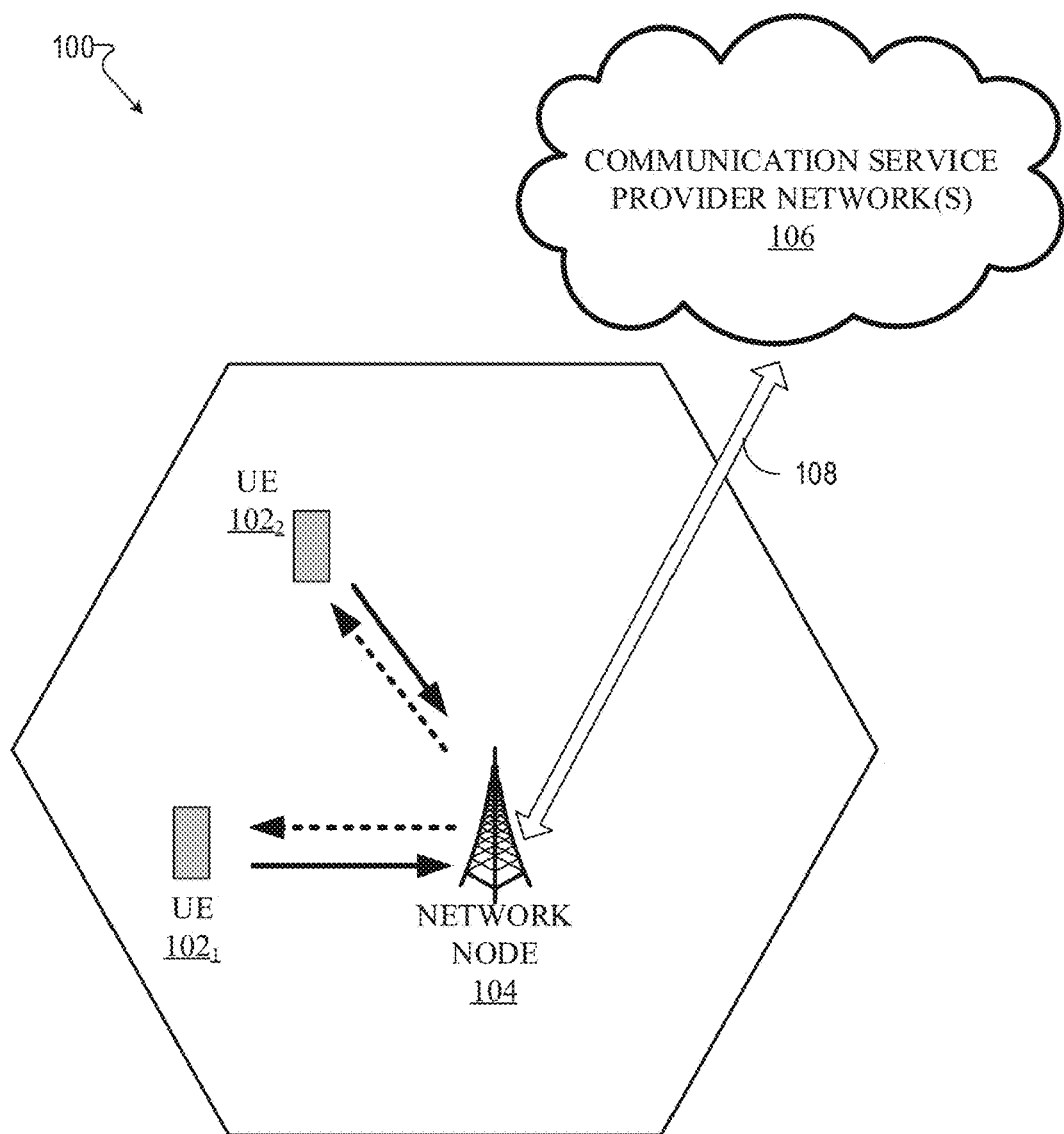
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate on-demand backhaul link management and measurements for a 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate on-demand backhaul link management and measurements for a 5G network. Facilitating on-demand backhaul link management and measurements for a 5G network can be implemented in connection with any type of device with a connection to the communications network (e.g., a mobile handset, a computer, a handheld device, etc.) any Internet of things (JOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Due to the expected larger bandwidth available for NR compared to LTE (e.g. mmWave spectrum) along with the native deployment of MIMO or multi-beam systems in NR, there is now an opportunity to develop and deploy integrated access and backhaul links. This can allow for deployment of a dense network of self-backhauled NR cells in an integrated manner by building upon control and data channels/procedures defined for providing access to UEs. An example illustration of a network with such integrated access and backhaul links can comprise a relay node (Relay DU) that can multiplex access and backhaul links in time, frequency, or space (e.g. beam-based operation).

While an integrated access backhaul (IAB) can be deployed in a standalone architecture where the access UEs and relay DUs receive both control and data bearers on NR, it is also possible to support IAB operation under a non-standalone (NSA) architecture where the control plane signalling is sent over LTE or another NR anchor carrier (e.g., sub6-GHz).

In an exemplary protocol stack structure for an IAB node, if the backhaul links carrying relay traffic (Ur) are based on the same channels and protocols as the access links carrying user data traffic (Uu), then it is possible to construct the IAB node as containing two parallel protocol stacks, one containing a UE function or also called a mobile termination (MT) function, which provides connectivity between the IAB node and a lower order IAB node or donor node which has a wired connection to the core network. The other IAB node functionality can be the gNB function or distributed unit (DU) function, which can provide connectivity between the IAB node and a higher order IAB node or access UEs.

In order to route the relay data traffic within the IAB node, in one example, an adaptation layer can be inserted above a radio link control (RLC) of both the UE and gNB functions of the IAB node. In other examples an adaptation layer can be inserted above the medium access control (MAC) and Packet Data Control Protocol (PDCP) layers. In addition to data routing, the IAB node can manage the control plane signalling and configurations for both the UE and gNB functions. An example of control plan signalling for the UE function can involve a radio resource control (RRC) and an F1 interface and operations, administration and maintenance (OAM) for the gNB function. This coordination can be performed internally in the IAB node by an IAB control (IAB-C) interface.

The control plane configuration of the UE and gNB function can be performed at the parent IAB node if it is a donor gNB, or it can be forwarded from the parent IAB node across one or more backhaul link hops from a central configuration entity or entities (e.g., at the gNB central-unit (CU) or RAN/OAM controller).

The IAB nodes can multiplex the access and backhaul links in time, frequency, or space (e.g. beam-based operation), which includes the transmission of signals/channels utilized as part of initial access and measurements used for radio resource management. The same physical layer signals and channels used for these purposes by access UEs can be reused use for performing similar procedures at the IAB node.

However, since the IAB nodes have both gNB functionality as well as UE functionality, the IAB node gNB function (e.g. IAB-DU) can transmit signals and channels used for backhaul link monitoring as well as receive reports from connected devices which can be both access UEs and higher order IAB nodes. At the same time, due to the hierarchical topology used for IAB, the UE function (e.g. IAB-MT) of the IAB node can perform backhaul measurements and send measurement reports for various procedures such as radio resource management (RRM), radio link monitoring (RLM), and L1 beam management to higher order parent nodes (e.g. IAB nodes or donor nodes).

In order to support topology formation, mobility/multi-connectivity procedures, and backhaul link management, periodic measurements and reports can be configured by a parent IAB node to a child IAB node UE function (e.g. IAB-MT). This can include radio resource management (RRM), radio link monitoring (RLM), and L1 beam management (L1-BM) measurements and reports.

Once the IAB-MT is connected to the network (e.g. in RRC CONNECTED mode), the network can provide a synchronization signal block (SSB) measurement and timing configuration (SMTC) for the IAB node UE, which can comprise the timing of SSB transmissions (including periodicity) and a list of SSB indices (e.g. bitmap) that the UE should utilize for performing RRM measurements, performing RLM in-sync/out-of-sync determinations, and selecting the best serving transmission beam based on L1-BM measurements. SSB measurements can additionally be used for topology/route management or mobility in case of mobile relay node operations.

As discussed previously, frequent transmission of SSBs can result in excessive overhead and result in undesirable scheduling restrictions on the IAB node gNB function since data transmissions cannot be scheduled when the IAB node UE function is performing measurements. Instead of relying on SSB-based measurements, the network can utilize CSI-RS for RRM/RLM/L1-BM functions and topology and route management measurements since the CSI-RS can have lower time/frequency resource overhead and can specifically be UE-configured with finer granularity than SSB-based measurements.

In mmWave frequencies, multiple SSBs can be transmitted in different spatial directions using different beams formed by the gNB antenna panel. While SSBs are transmitted in a cell-specific manner, CSI-RS can also be transmitted in different spatial directions with the same beamwidth or narrower beamwidth than SSBs depending on the analog/digital beamforming weights. Unlike SSBs, CSI-RS can be UE configured with a subset of CSI-RS resources dedicated for given UE or group of UEs depending on their spatial location.

The network can configure CSI-RS configurations 1-1, 1-2, and 1-3 to be associated with SSB 1 and CSI-RS configurations 2-1, 2-2, and 2-3 to be associated with SSB 2. The configuration of a CSI-RS can therefore be based on feedback from the UE on the strongest SSB. For IAB, the parent node can utilize SSB based measurements for regular access UEs to avoid the need for determining an appropriate CSI-RS configuration (which can change due to link blockage or UE mobility events), however for IAB nodes which can be largely stationary, after initial access the network can configure a CSI-RS measurement configuration where the CSI-RS configuration is based on the associated SSB timing pattern (e.g. alternating or staggered). In case the CSI-RS is used for inter-IAB node measurements, the same or different muting patterns can be configured and utilized by IAB nodes, since the CSI-RS can have different granularity in terms of time/frequency resources and number of supported beams compared to SSB based muting configurations.

Since the IAB nodes can not need to perform frequent SSB detection/measurements compared to access UEs due to lack of mobility or slow varying topology (e.g. IAB nodes turning on/off), the resource configuration and periodicity for the SSBs used by access UEs, which are not muted, can be different from the resource configuration and periodicity used for SSB transmissions of the IAB nodes, which are subject to the muting pattern. Furthermore, the network can wish to trigger on-demand inter-IAB node discovery and measurement. In this case, the network can configure a large periodicity for the periodic IAB discovery measurements and depending on the network determination (e.g. new IAB node power-on or traffic load balancing event), send signalling to the IAB nodes to perform IAB node discovery at specific time instances/durations and apply a specific IAB muting pattern. This can be beneficial since the network can only indicate to a subset of IAB nodes to perform the inter-IAB node discovery, which can minimize the overhead of the SSB transmissions or the required orthogonality (e.g. number of uniquely discoverable nodes) of the muting pattern. In addition, the IAB node can send signalling to the network requesting aperiodic inter-IAB node discovery to be triggered for a certain duration and with a specific time/frequency resource configuration.

In addition to on-demand triggering of inter-IAB node discovery and RRM measurement, the reporting to the network of the measurements from IAB nodes can also be aperiodic and based on event criteria. For example, if an IAB node performs a measurement during a given discovery period and does not detect any additional IAB nodes, it cannot provide an updated measurement/detection report to the network in order to avoid the overhead of such UL transmissions. In another example, the IAB node provides a measurement report if newly discovered IAB nodes are detected, or if the measurement quantity (e.g. reference signal received power (RSRP/reference signal received quality (RSRQ)) has changed outside of a configured range compared to a previous measurement or increases/decreases compared to an absolute threshold configured by the network.

For the purpose of backhaul link RLM, either SSB or CSI-RS based in-sync (IS)/out-of-sync (OOS) determinations can be made. However, similar to the inter-IAB node discovery case, frequent transmissions of the reference signals by the parent or donor node can increase the overhead and impact of the scheduling restrictions imposed by the half-duplex constraint at the child IAB node. As a result, the IAB-MT can be configured with both periodic and aperiodic RLM, where the periodic configuration can use a large periodicity and the aperiodic configuration can be activated by the network based on one or more criteria such as CSI feedback, L1-BM RSRP, RRM measurement reports, or indication of beam failure or partial beam failure.

In another alternative embodiment, the IAB-MT can make a request for aperiodic RLM to be configured using signalling, which can indicate the timing and resource configuration (including reference signal type). The aperiodic RLM request can be triggered at the IAB-MT based on criteria such as link quality metrics derived from periodic IS/OOS reports falling below a given threshold or based on other measurements such as CSI/L1-RSRP/RRM measurements. In another alternative the IAB-MT can make the aperiodic RLM request based on a request from the IAB-DU to support a desired IAB node transmission/reception state across the IAB node, subject to the half-duplex constraint.

L1-BM measurements and reports based on SSBs or CSI-RS can be used for backhaul link beam management and also potentially cross-link interference (CLI) measurements across backhaul links, aperiodic measurements and reports can be configured. For access links which are subject to frequent mobility or blockage events, the IAB-MT cannot need to report non-CQI aspects of the L1-BM reports (e.g. L1-RSRP, N best Tx beams, or SINR metric) unless there has been a change in those metrics above a network configured threshold or other backhaul link quality criteria. This is beneficial to save reporting overhead, and support event-driven operation of the backhaul beam management/CLI reports similar to that previously described for RRM reports.

In one embodiment, described herein is a method comprising connecting, by a first wireless network device comprising a processor, a mobile device function of the first wireless network device to a second wireless network device. In response to the connecting, the method can comprise receiving, by the first wireless network device for the mobile device function, synchronization signal block data representative of a synchronization signal block measurement. Based on the receiving the synchronization signal block data, the method can comprise performing, by the first wireless network device, a radio resource measurement, wherein the radio resource measurement comprises a beam management measurement. Based on the beam management measurement, the method can comprise selecting, by the first wireless network device, a transmission beam to be used by the first wireless network device.

According to another embodiment, a system can facilitate connecting a mobile device function, of a first wireless network device, to a second wireless network device. In response to the connecting, the system can comprise receiving for the mobile device function, synchronization signal block data representative of a synchronization signal block measurement associated with a synchronization signal block. Based on the receiving the synchronization signal block data, the system can comprise performing a radio resource measurement, wherein the radio resource measurement comprises a beam management measurement. Additionally, based on the beam management measurement, the system can comprise selecting a transmission beam to be used by the first wireless network device.

In yet another embodiment, described herein is a machine-readable medium that can perform the operations comprising facilitating connecting a mobile device function, of a first wireless network device, to a second wireless network device. The machine-readable medium can perform the operations comprising facilitating receiving, for the mobile device function, synchronization signal block data representative of a synchronization signal block measurement in response to the facilitating the connecting. Based on the facilitating the receiving the synchronization signal block data, the machine-readable medium can perform the operations comprising facilitating performing a radio resource measurement, wherein the radio resource measurement comprises a beam management measurement. Furthermore, based on the beam management measurement, the machine-readable medium can perform the operations comprising facilitating selecting a transmission beam to be used by the first wireless network device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, pico-cell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
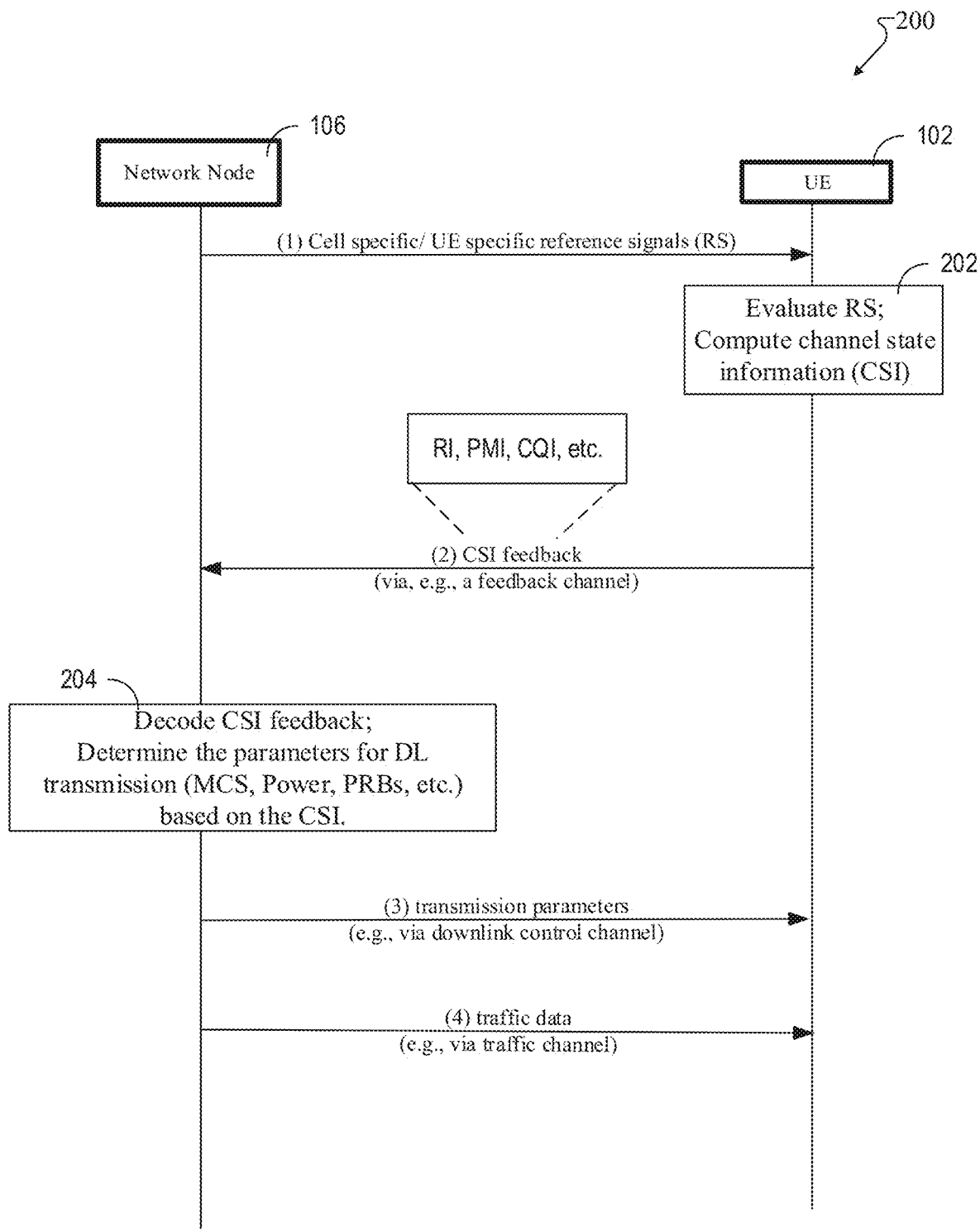
FIG. 2 illustrates an example schematic system block diagram of a message sequence chart between a network node and UE according to one or more embodiments.

Referring now to FIG. 2, illustrated is an example schematic system block diagram of a message sequence chart between a network node and user equipment according to one or more embodiments.

FIG. 2 depicts a message sequence chart for downlink data transfer in 5G systems 200. The network node 104 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 202. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 104 via a feedback channel either on request from the network node 104, a-periodically, and/or periodically. A network scheduler can leverage the CSI report to determine downlink transmission scheduling parameters at 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 104 and then sent over to the user equipment 102 as a part of the downlink control channel data. The network node 104 can transmit the scheduling parameters, comprising the adjusted densities, to the user equipment 102 via the downlink control channel. Thereafter and/or simultaneously, data can be transferred, via a data traffic channel, from the network node 104 to the user equipment 102.

Figure 3:
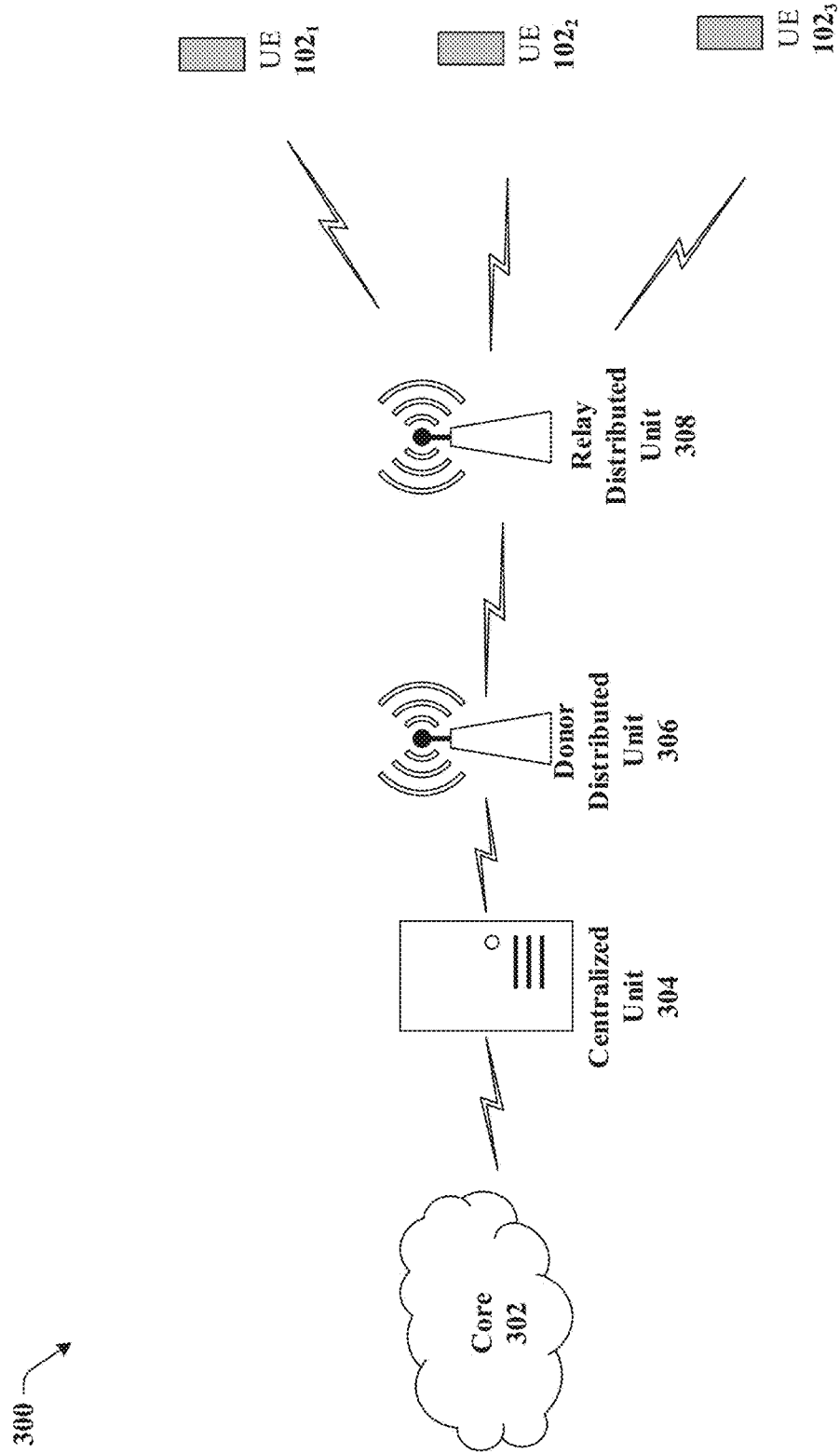
FIG. 3 illustrates an example schematic system block diagram of an integrated access backhaul link according to one or more embodiments.

Referring now to FIG. 3, illustrated is an example schematic system block diagram of integrated access and backhaul links according to one or more embodiments. For example, the network 300, as represented in FIG. 3 with integrated access and backhaul links, can allow a relay node to multiplex access and backhaul links in time, frequency, and/or space (e.g. beam-based operation). Thus, FIG. 3 illustrates a generic IAB set-up comprising a core network 302, a centralized unit 304, a donor distributed unit 306, a relay distributed unit 308, and UEs 1021, 1022, 1023. The donor distributed unit 306 (e.g., access point) can have a wired backhaul with a protocol stack and can relay the user traffic for the UEs 1021, 1022, 1023 across the IAB and backhaul link. Then the relay distributed unit 308 can take the backhaul link and convert it into different strains for the connected UEs 1021, 1022, 1023. Although FIG. 3 depicts a single hop (e.g., over the air), it should be noted that multiple backhaul hops can occur in other embodiments.

The relays can have the same type of distributed unit structure that the gNode B has. For 5G, the protocol stack can be split, where some of the stack is centralized. For example, the PDCP layer and above can be at the centralized unit 304, but in a real time application part of the protocol stack, the RLC, the MAC, and the PHY can be co-located with the base station wherein the system can comprise an F1 interface. In order to add relaying, the F1 interface can be wireless so that the same structure of the donor distributed unit 306 can be kept.

Figure 4:
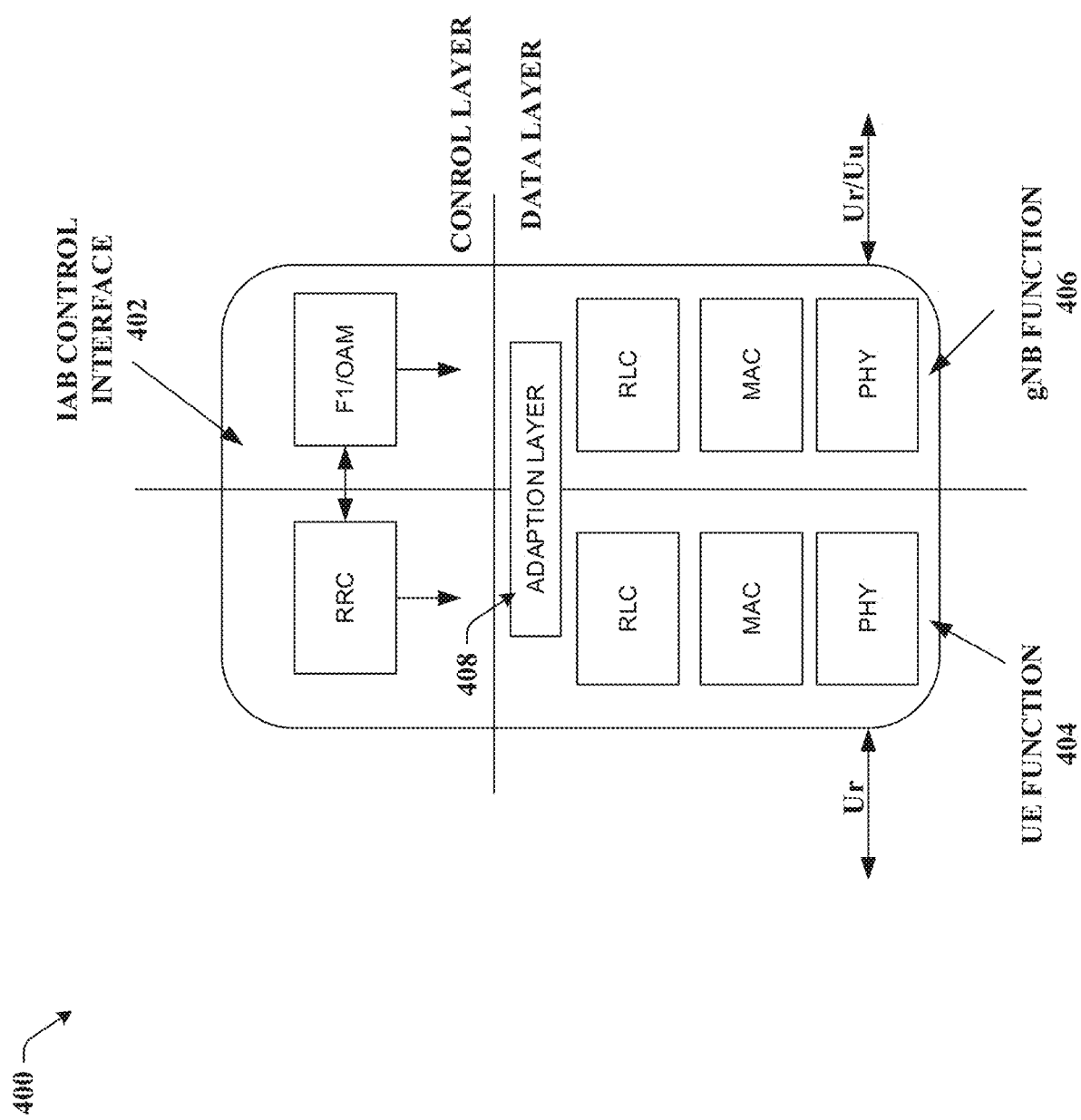
FIG. 4 illustrates an example schematic system block diagram of an integrated access backhaul link node protocol stack according to one or more embodiments.

Referring now to FIG. 4, illustrated is an example schematic system block diagram of an integrated access backhaul (IAB) node 400 protocol stack according to one or more embodiments. The IAB node 400 can receive relay links (Ur) in the same manner that a UE receives and processes relay links. For example, the data traffic from the UE function 404 can transition up to the adaption layer 408 and then transition down to the gNode B function 406 of the IAB node 400. From there the data can be sent to another user or to another backhaul node if there are additional hops. With reference to FIG. 3, The IAB node 400 protocol stack can be between the donor distributed unit 306 and the relay distributed unit 308. An IAB control interference 402 can be introduced because the UE function 404 can be configured by the network and typically uses RRC signaling to for the configuration. However, the gNode B function 406 (relay distributed unit 308) can be controlled by the F1/OAM. Thus, a separate protocol stack can be leveraged for the gNode B function 406 and the IAB control interface 402 can connect the UE function 404 to the gNode B function 406 to can coordinate radio resources.

Figure 5:
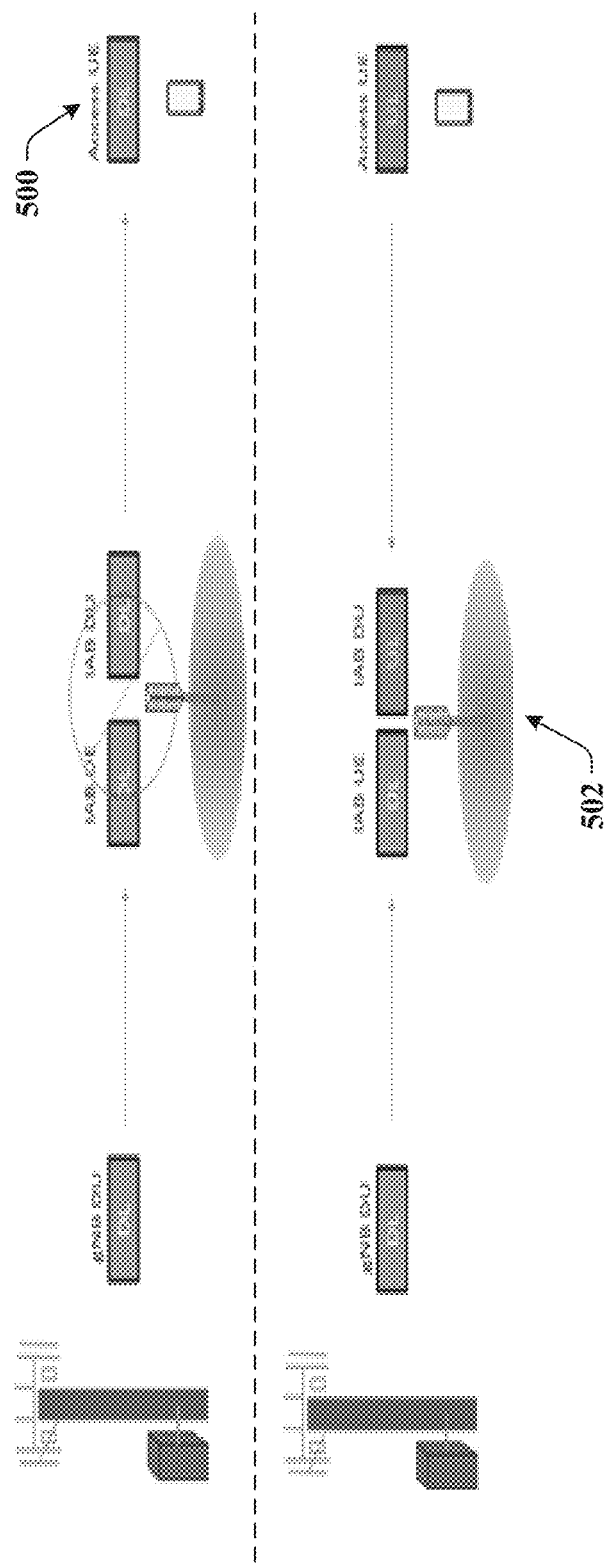
FIG. 5 illustrates an example schematic system block diagram of an in-band operation of backhaul and access links according to one or more embodiments.

Referring now to FIG. 5 illustrates an example schematic system block diagram of an in-band operation of backhaul and access links according to one or more embodiments. In the case of in-band operation of backhaul and access links, due to the half-duplexing constraint, IAB nodes are expected to do the following: 1) receive on the access link and/or backhaul link at any given time; and 2) transmit on the access link and/or backhaul link at any given time.

As a result, while the same physical signals can be used for both the UE and the IAB node, different configurations of the resources and/or transmission period(s) of the signals used for initial access for access UEs and IAB nodes can be required. In addition, since the UE functionality for IAB nodes is not fully identical with access UEs (e.g., optimized physical layer parameters, support for control plane messaging related to relay route/topology management) the network can identify which UEs performing initial access are normal access UEs 500 or IAB nodes with UE functionality 502. Also, the parameters configuring radio resource management (RRM) operations at the IAB node gNB function can consider the half-duplex constraint imposed by the UE function and can also take into account hop order and other topology/route management functionalities. As a result, periodic measurements and reports may not be optimal for IAB operation due to the overhead and scheduling constraints imposed by the half-duplex constraint.

Figure 6:
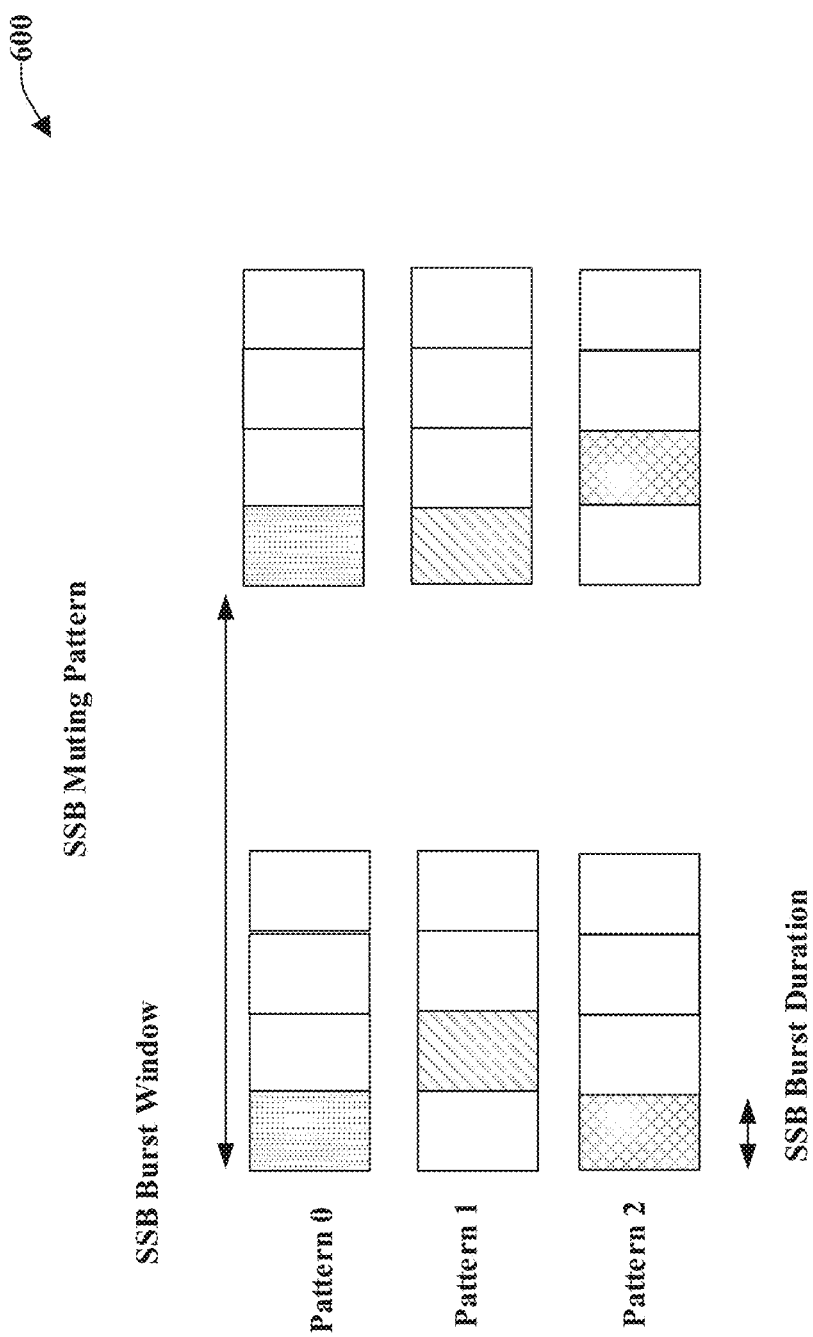
FIG. 6 illustrates an example schematic system block diagram of an example muting pattern according to one or more embodiments.

Referring now to FIG. 6, illustrated is an example muting pattern according to one or more embodiments. In one embodiment the SSB transmissions may be muted according to a predefined or (pseudo) random pattern. An example of an SSB muting pattern is shown in FIG. 6 where different patterns can be used by different IAB nodes to ensure that all IAB nodes have equal periods where they transmit SSBs and where there are able to make SSB measurements from the transmissions of other IAB nodes. In FIG. 6, nodes transmitting pattern 0 or pattern 2 in the first SSB burst window can detect and measure the transmissions of nodes transmitting pattern 1, while nodes transmitting pattern 0 cannot detect pattern 2 and nodes transmitting pattern 2 can detect pattern 0 in the same window. However in the next window, which occurs after a configured SSB burst periodicity (e.g., 80 ms) the pattern can be changed such that the IAB nodes transmitting pattern 0 and pattern 2 can detect each other's SSB transmissions. Thus, it is possible for all IAB nodes to detect transmissions of all other nodes within the total muting pattern duration.

The utilization of a given pattern by an IAB node can be based on a network (pre) configuration, which can indicate the time/frequency resources for SSB transmissions within a given burst duration as well as the muting pattern periodicity. Additionally the muting pattern can be configured by (pseudo) random parameters such as physical cell ID, IAB node ID (including IAB-DU and/or IAB-MT ID), route/hop order ID, or other higher layer configured parameter.

Figure 7:
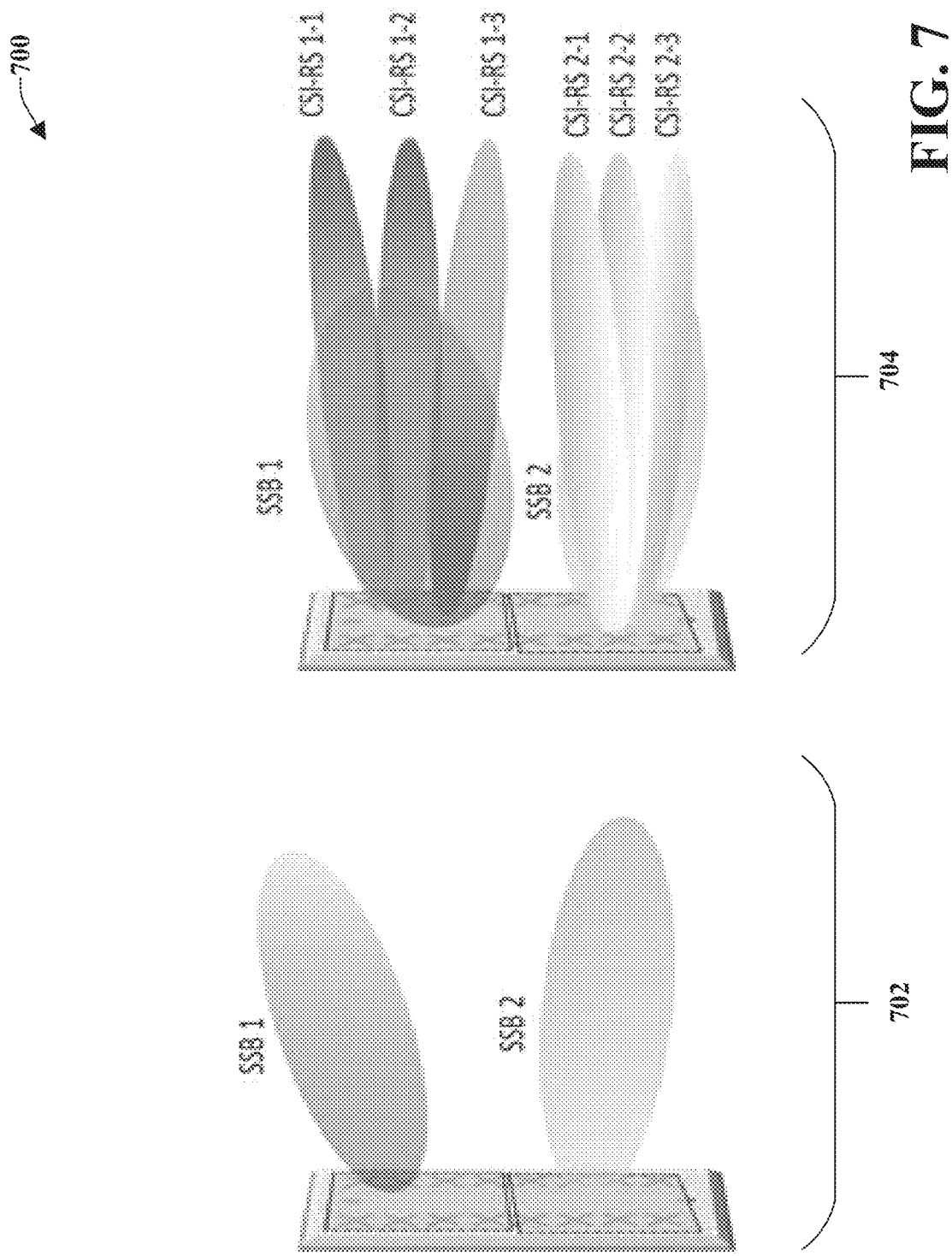
FIG. 7 illustrates an example schematic system block diagram of integrated access backhaul link SSB pattern options according to one or more embodiments.

Referring now to FIG. 7, illustrated is an example schematic system block diagram of integrated access backhaul link SSB pattern options according to one or more embodiments. Although SS block configuration can be used with the disclosed system, a CSI-RS configuration 700 can also be used to take advantage of their narrower beams and utilize the CSI-RS resources needed for a given relay node or a given UE. To utilize the CSI-RS configuration 700, the system can first connect using the SS blocks SSB1, SSB2 (depicted as 702). Then, the network can determine and leverage CSI-RS resources CSI-RS 1-1, CSI-RS 1-2, CSI-RS 1-3, CSI-RS 2-1, CSI-RS 2-2, CSI-RS 2-3. The network can then determine which CSI-RS resources (e.g., CSI-RS 1-1, CSI-RS 1-2, CSI-RS 1-3) can be used for the relay nodes using SSB1 and/or which CSI-RS resources (e.g., CSI-RS 2-1, CSI-RS 2-2, CSI-RS 2-3) can be used for the UEs using SSB2 (e.g., depicted as 704). Next, the network can coordinate the CSI-RS resources CSI-RS 1-1, CSI-RS 1-2, CSI-RS 1-3, CSI-RS 2-1, CSI-RS 2-2, CSI-RS 2-3 by utilizing the IAB control interface.

Figure 8:
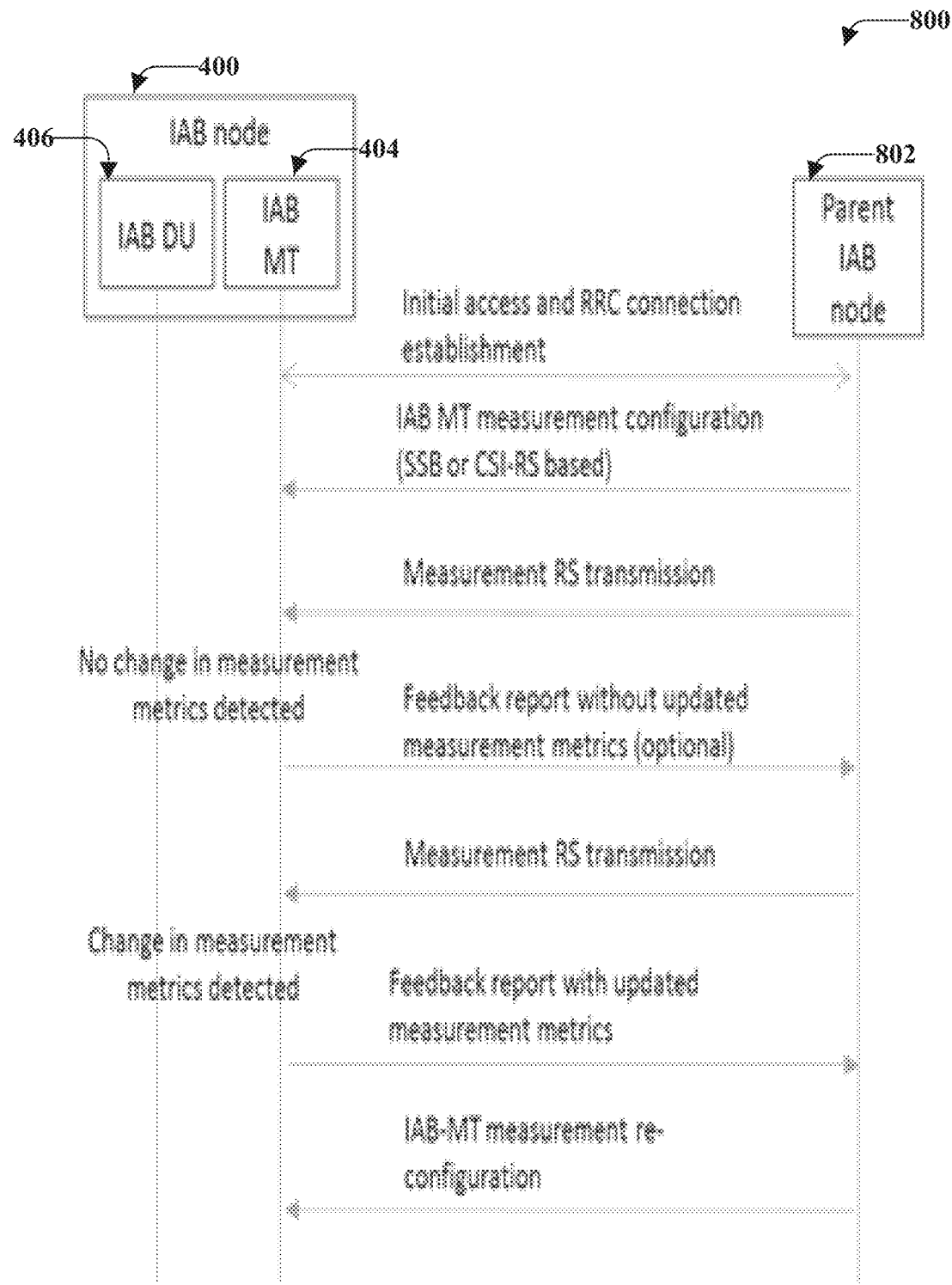
FIG. 8 illustrates an example schematic system block diagram of an example criteria-based management report according to one or more embodiments.

Referring now to FIG. 8, illustrated is an example schematic system block diagram of an example criteria-based management report according to one or more embodiments. In addition to on-demand triggering of inter-IAB node discovery and RRM measurement, the reporting to the network of the measurements from IAB nodes can also be aperiodic and based on event criteria. For example, if an IAB node 400 performs a measurement during a given discovery period and does not detect any additional IAB nodes, it cannot provide an updated measurement/detection report to the network in order to avoid the overhead of such UL transmissions. In another example, the IAB node 400 can provide a measurement report if newly discovered IAB nodes 802 are detected, or if the measurement quantity (e.g. reference signal received power (RSRP/reference signal received quality (RSRQ)) has changed outside of a configured range compared to a previous measurement or increases/decreases compared to an absolute threshold configured by the network. This can apply to both RRM measurements and reports as well L1-BM reports.

Figure 9:
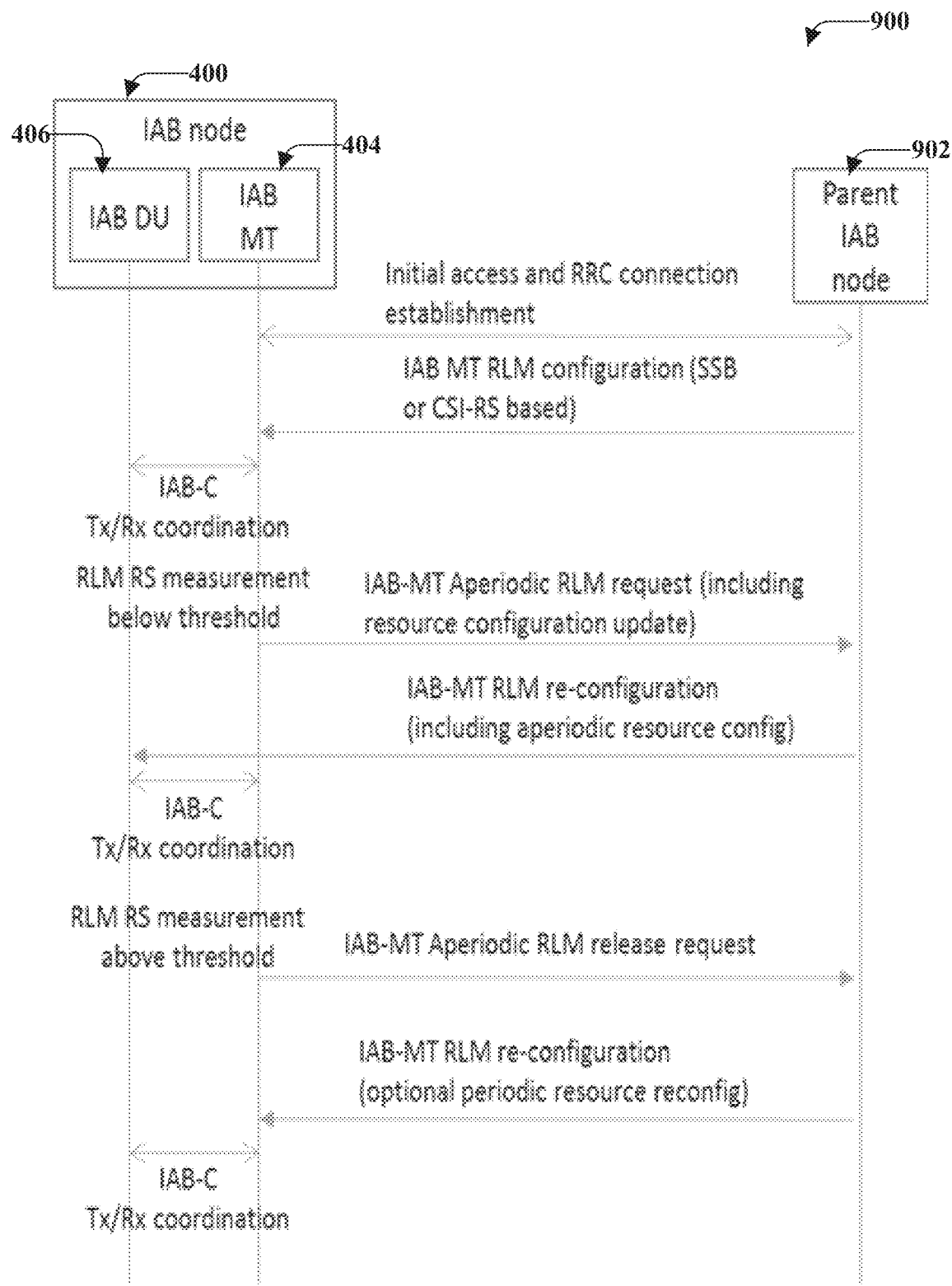
FIG. 9 illustrates an example schematic system block diagram of an initiated aperiodic resource link management according to one or more embodiments.

Referring now to FIG. 9, illustrates an example schematic system block diagram of an initiated aperiodic resource link management according to one or more embodiments. For the purpose of backhaul link RLM, either SSB or CSI-RS based in-sync (IS)/out-of-sync (OOS) determinations can be made. However, similar to the inter-IAB node discovery case, frequent transmissions of the reference signals by the parent or donor node 902 can increase the overhead and impact of the scheduling restrictions imposed by the half-duplex constraint at the child IAB node 400. As a result, the IAB-MT (e.g., UE function 404) can be configured with both periodic and aperiodic RLM, where the periodic configuration can use a large periodicity and the aperiodic configuration can be activated by the network based on one or more criteria such as CSI feedback, L1-BM RSRP, RRM measurement reports, or indication of beam failure or partial beam failure.

In another alternative embodiment, the IAB-MT (e.g., UE function 404) can make a request for aperiodic RLM to be configured using signalling, which can indicate the timing and resource configuration (including reference signal type). The aperiodic RLM request can be triggered at the IAB-MT based on criteria such as link quality metrics derived from periodic IS/OOS reports falling below a given threshold or based on other measurements such as CSI/L1-RSRP/RRM measurements. In another alternative the IAB-MT (e.g., UE function 404) can make the aperiodic RLM request based on a request from the IAB-DU (e.g., gNode B function 406) to support a desired IAB node transmission/reception state across the IAB node, subject to the half-duplex constraint.

Figure 10:
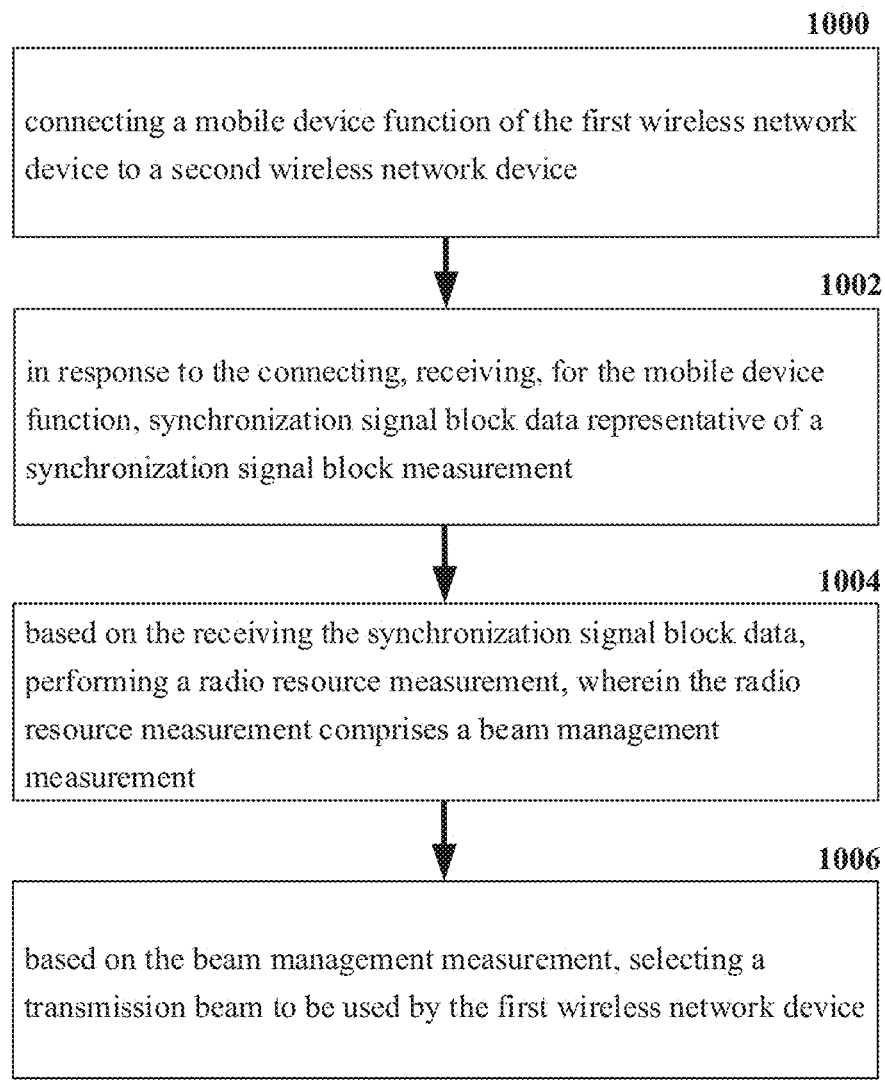
FIG. 10 illustrates an example flow diagram for a method for radio resource configuration and measurements for a 5G network according to one or more embodiments.

Referring now to FIG. 10, illustrated is an example flow diagram for a method for radio resource configuration and measurements for a 5G network according to one or more embodiments. At element 1000, the method can comprise connecting a mobile device function (e.g., UE function 404) of the first wireless network device (e.g., IAB node 400) to a second wireless network device (e.g., parent IAB node 802). At element 1002, the method can comprise receiving (e.g., via the IAB node 400) synchronization signal block data representative of a synchronization signal block measurement in response to the connecting. At element 1004, the method can comprise, based on the receiving the synchronization signal block data, performing (e.g., via the IAB node 400) a radio resource measurement, wherein the radio resource measurement comprises a beam management measurement. Additionally, at element 1006, the method can comprise selecting (e.g., via the IAB node 400) a transmission beam to be used by the first wireless network device based on the beam management measurement.

Figure 11:
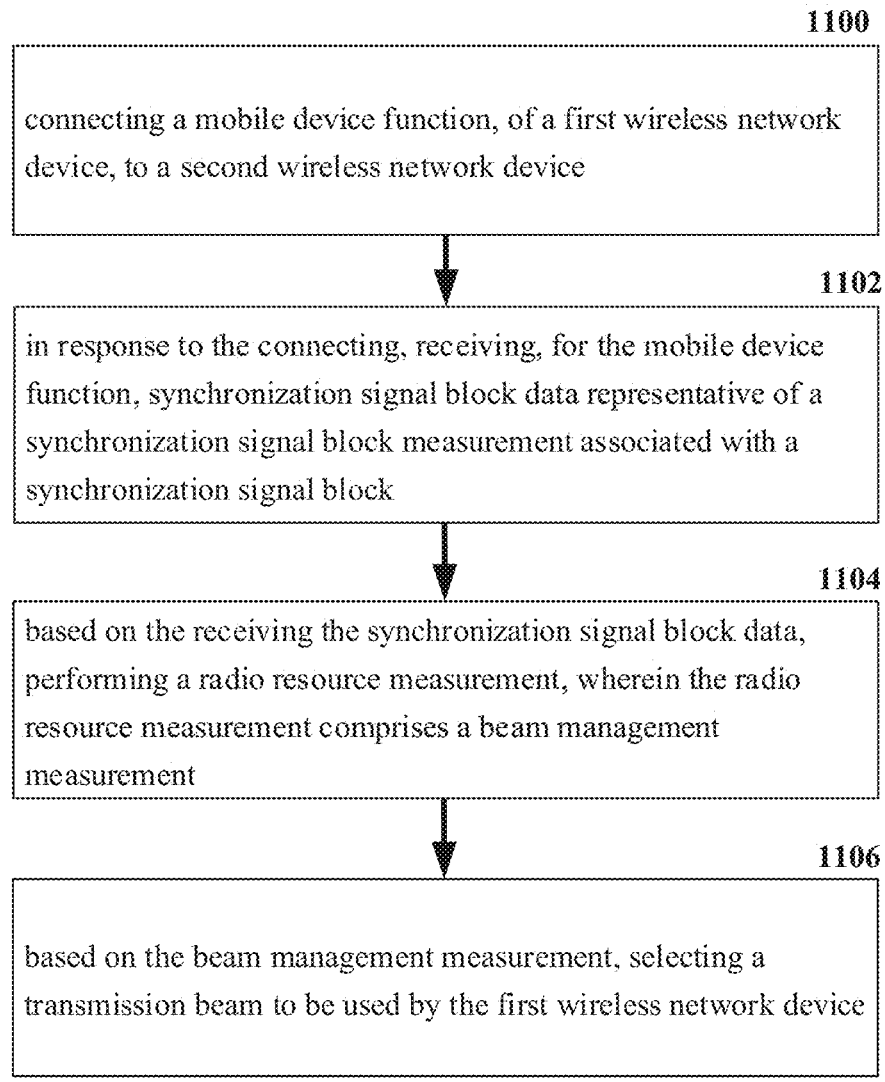
FIG. 11 illustrates an example flow diagram for a system for radio resource configuration and measurements for a 5G network according to one or more embodiments.

Referring now to FIG. 11, illustrated is an example flow diagram for a system for radio resource configuration and measurements for a 5G network according to one or more embodiments. According to another embodiment, at element 1100 a system can facilitate connecting a mobile device function (e.g., UE function 404), of a first wireless network device (e.g., IAB node 400), to a second wireless network device (e.g., parent IAB node 802). In response to the connecting, at element 1102, the system can comprise receiving, for the mobile device function (e.g., UE function 404), synchronization signal block data representative of a synchronization signal block measurement associated with a synchronization signal block. At element 1104, based on the receiving the synchronization signal block data, the system can comprise performing a radio resource measurement, wherein the radio resource measurement comprises a beam management measurement. Additionally, based on the beam management measurement, the system can comprise selecting a transmission beam to be used by the first wireless network device (e.g., IAB node 400) at element 1106.

Figure 12:
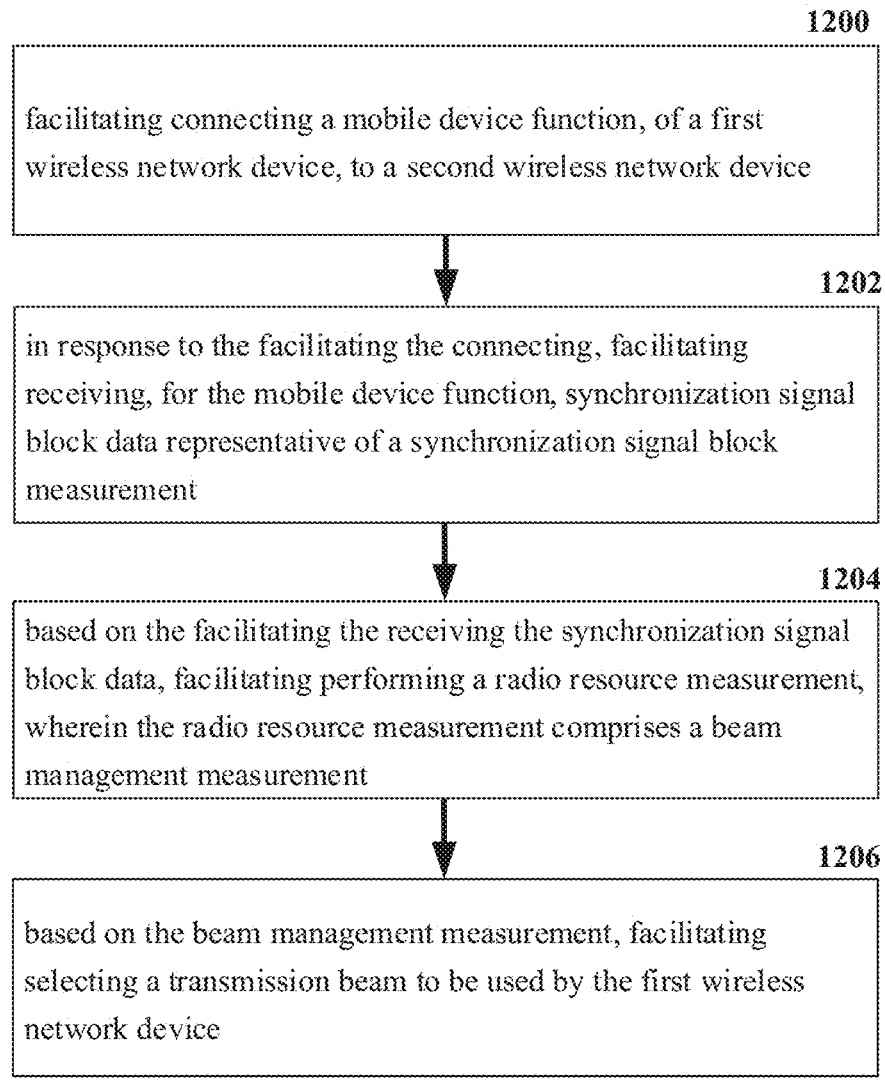
FIG. 12 illustrates an example flow diagram for a machine-readable medium for radio resource configuration and measurements for a 5G network according to one or more embodiments.

Referring now to FIG. 12, illustrated is an example flow diagram for a machine-readable medium for radio resource configuration and measurements for a 5G network according to one or more embodiments.

At element 1200, a machine-readable medium can perform the operations comprising facilitating connecting a mobile device function (e.g., UE function 404), of a first wireless network device (e.g., IAB node 400), to a second wireless network device (e.g., parent IAB node 802). At element 1202, the machine-readable medium can perform the operations comprising facilitating receiving, for the mobile device function (e.g., UE function 404), synchronization signal block data representative of a synchronization signal block measurement in response to the facilitating the connecting. Based on the facilitating the receiving the synchronization signal block data, at element 1204, the machine-readable medium can perform the operations comprising facilitating performing a radio resource measurement, wherein the radio resource measurement comprises a beam management measurement. Furthermore, at element 1206, based on the beam management measurement, the machine-readable medium can perform the operations comprising facilitating selecting a transmission beam to be used by the first wireless network device (e.g., IAB node 400).

Figure 13:
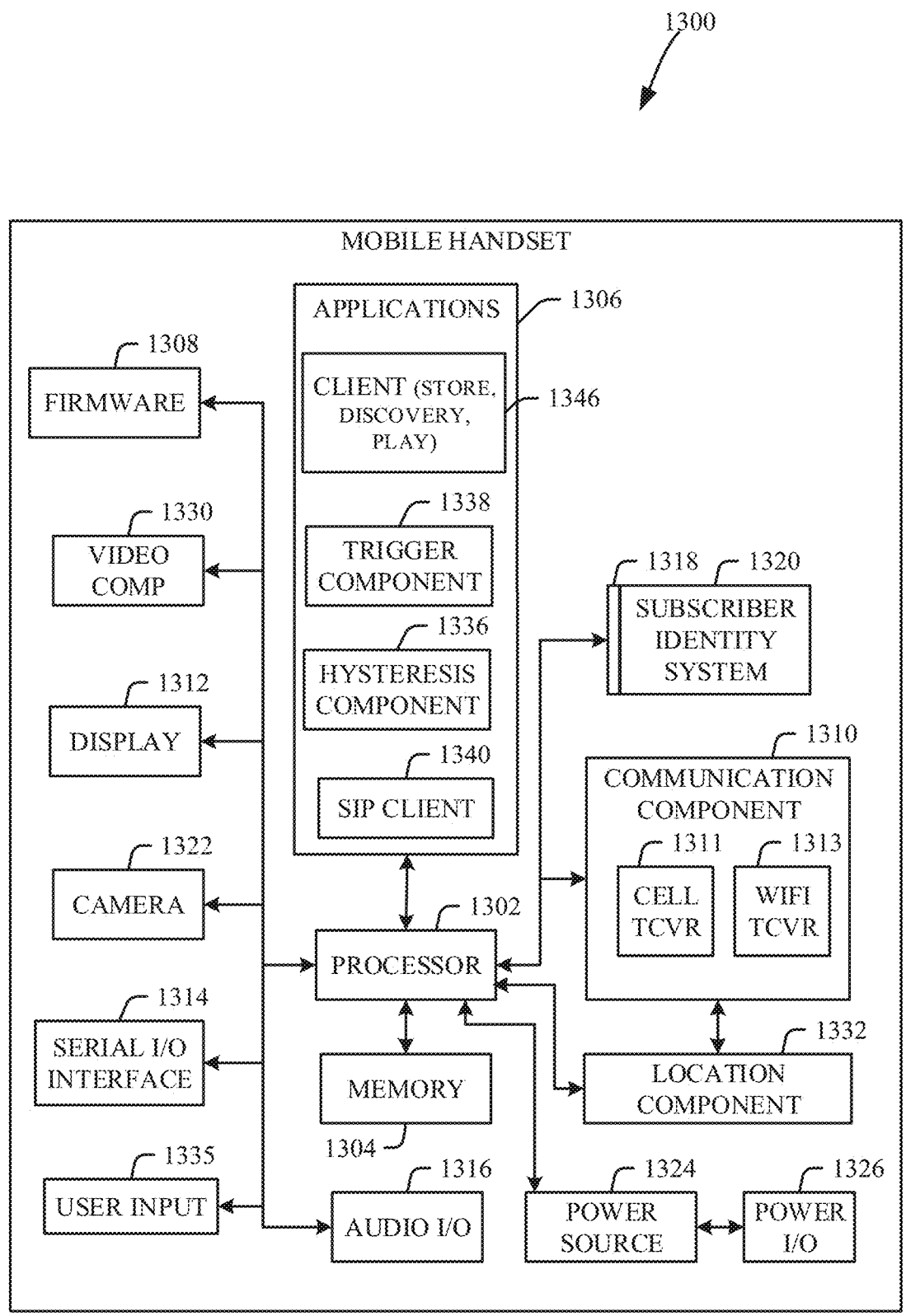
FIG. 13 illustrates an example block diagram of an example mobile handset operable to engage in a system architecture that facilitates secure wireless communication according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
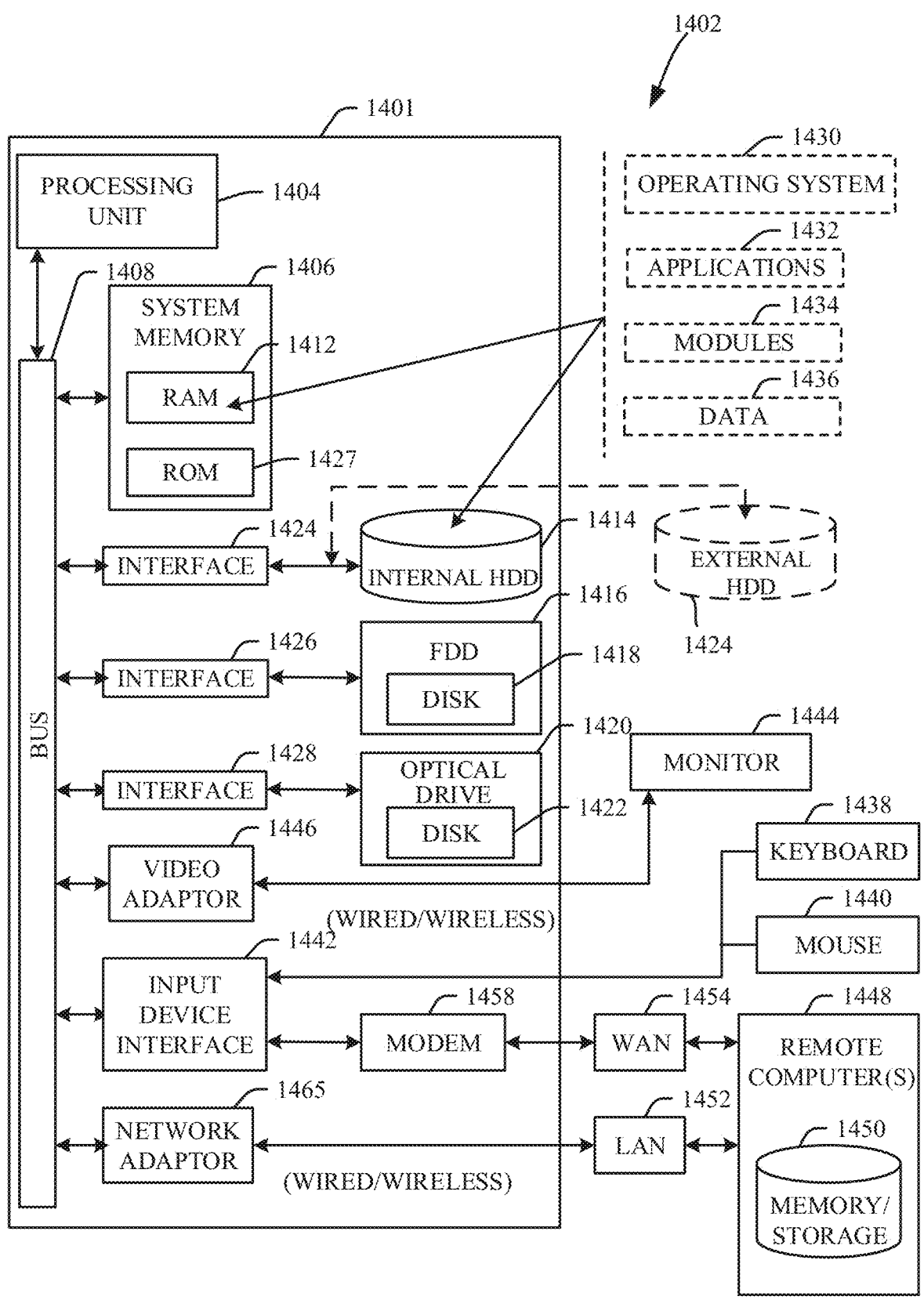
FIG. 14 illustrates an example block diagram of an example computer operable to engage in a system architecture that facilitates secure wireless communication according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 14 is but one example of a computing device.

In order to provide a context for the various aspects of the disclosed subject matter, FIG. 14 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1420 (see below), non-volatile memory 1422 (see below), disk storage 1424 (see below), and memory storage 1446 (see below). Further, nonvolatile memory can be included in read only memory (ROM), programmable ROM (PROM), electrically programmable ROM (EPROM), electrically erasable ROM (EEPROM), or flash memory.

Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 14 illustrates a block diagram of a computing system 1400 operable to execute the disclosed systems and methods in accordance with an embodiment. Computer 1412, which can be, for example, part of the hardware of system 1420, includes a processing unit 1414, a system memory 1416, and a system bus 1418. System bus 1418 couples system components including, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1494), and Small Computer Systems Interface (SCSI).

System memory 1416 can include volatile memory 1420 and nonvolatile memory 1422. A basic input/output system (BIOS), containing routines to transfer information between elements within computer 1412, such as during start-up, can be stored in nonvolatile memory 1422. By way of illustration, and not limitation, nonvolatile memory 1422 can include ROM, PROM, EPROM, EEPROM, or flash memory. Volatile memory 1420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 can also include removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 14 describes software that acts as an intermediary between users and computer resources described in suitable operating environment 1400. Such software includes an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be noted that the disclosed subject matter can be implemented with various operating systems or combinations of operating systems.

A user can enter commands or information into computer 1412 through input device(s) 1436. As an example, a mobile device and/or portable device can include a user interface embodied in a touch sensitive display panel allowing a user to interact with computer 1412. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1414 through system bus 1418 by way of interface port(s) 1438. Interface port(s) 1438 include, for example, a serial port, a parallel port, a game port, a universal serial bus (USB), an infrared port, a Bluetooth port, an IP port, or a logical port associated with a wireless service, etc. Output device(s) 1440 and a move use some of the same type of ports as input device(s) 1436.

Thus, for example, a USB port can be used to provide input to computer 1412 and to output information from computer 1412 to an output device 1440. Output adapter 1442 is provided to illustrate that there are some output devices 1440 like monitors, speakers, and printers, among other output devices 1440, which use special adapters. Output adapters 1442 include, by way of illustration and not limitation, video and sound cards that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, cloud storage, cloud service, a workstation, a microprocessor based appliance, a peer device, or other common network node and the like, and typically includes many or all of the elements described relative to computer 1412.

For purposes of brevity, only a memory storage device 1446 is illustrated with remote computer(s) 1444. Remote computer(s) 1444 is logically connected to computer 1412 through a network interface 1448 and then physically connected by way of communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network. Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method, comprising:
   receiving, by first network equipment comprising a processor, synchronization signal block data, for a mobile equipment function of the first network equipment, representative of a synchronization signal block measurement associated with a synchronization signal block;
   based on the synchronization signal block data, configuring, by the first network equipment, channel state data to be transmitted via a first beamwidth that is narrower than a second beamwidth associated with the synchronization signal block, the configuring resulting in configured channel state data;
   in response to a reference signal received power being determined to have satisfied a function with respect to a threshold value, generating, by the first network equipment, measurement data representative of a radio resource management metric associated with the first network equipment;
   based on the configured channel state data, performing, by the first network equipment, a radio resource measurement, wherein the radio resource measurement comprises a beam management measurement associated with a second network equipment being connected to the mobile equipment function; and
   based on the beam management measurement and in accordance with the second network equipment, selecting, by the first network equipment, a transmission beam to be used by the first network equipment.

2. The method of claim 1, further comprising:
   receiving, by the first network equipment, for the mobile equipment function, timing configuration data representative of a timing configuration to be utilized by the mobile equipment function.

3. The method of claim 1, further comprising:
   connecting, by first network equipment, the mobile equipment function of the first network equipment to the second network equipment.

4. The method of claim 1, wherein the synchronization signal block data comprises route management data representative of a network route to be managed.

5. The method of claim 1, wherein selecting the transmission beam is based on a hop order associated with the second network equipment.

6. The method of claim 1, wherein selecting the transmission beam is based on a topology management function associated with the second network equipment.

7. The method of claim 1, further comprising:
   generating, by the first network equipment, synchronization signal block measurement and timing configuration data representative of a time associated with a synchronization signal block transmission to be utilized by the second network equipment.

8. A system, comprising:
   a processor; and
   a memory that stores executable instructions that, when executed by the processor, facilitate performance of operations, comprising:
   in response to a reference signal received power being determined to have satisfied a function with respect to a threshold, transmitting, to first network equipment that is connected to a mobile equipment function of second network equipment, measurement data representative of a radio resource management metric associated with the second network equipment;
   receiving, for the mobile equipment function, synchronization signal block data representative of a synchronization signal block measurement associated with a synchronization signal block;
   in response to the receiving, configuring channel state data to be transmitted via a first beamwidth that is narrower than a second beamwidth associated with the synchronization signal block data, the configuring resulting in configured channel state data;
   based on the configured channel state data, performing a radio resource measurement, wherein the radio resource measurement comprises a beam management measurement; and
   based on the beam management measurement, selecting a transmission beam to be used by the first network equipment.

9. The system of claim 8, wherein the operations further comprise:
   based on a hop order associated with the first network equipment, generating a muting pattern to mute a transmission of the synchronization signal block.

10. The system of claim 8, wherein the operations further comprise:
    based on a periodicity of a muting pattern, utilizing the muting pattern to mute a transmission of the synchronization signal block associated with the first network equipment.

11. The system of claim 8, wherein the operations further comprise:

configuring a muting pattern in accordance with a physical cell identification associated with the second network equipment.

12. The system of claim 8, wherein the operations further comprise:
configuring a muting pattern in accordance with a hop order identification associated with the first network equipment.

13. The system of claim 8, wherein the operations further comprise:
linking the mobile equipment function, of first network equipment, to second network equipment.

14. The system of claim 8, wherein the operations further comprise:
configuring channel state reference signal data in accordance with the first network equipment to be dedicated to the first network equipment.

15. A non-transitory machine-readable medium, comprising executable instructions that, when executed by a processor, facilitate performance of operations, comprising:
in response to a current reference signal received power being determined to be less than a previous reference signal received power, facilitating transmitting, by first network equipment to second network equipment, measurement data representative of a radio resource management metric associated with the first network equipment;
facilitating receiving, for a mobile device function of the first network equipment that is connected to the second network equipment, synchronization signal block data representative of a synchronization signal block measurement;
based on the synchronization signal block data, configuring channel state data to be transmitted on a first beamwidth that is narrower than a second beamwidth associated with the synchronization signal block data, the configuring resulting in configured channel state data;
based on the configured channel state data, facilitating performing a radio resource measurement, wherein the radio resource measurement comprises a beam management measurement; and
based on the beam management measurement, facilitating selecting a transmission beam to be used by the first network equipment.

16. The non-transitory machine-readable medium of claim 15, wherein the operations further comprise:
in response to the facilitating of the receiving of the synchronization signal block data, configuring the channel state data to be associated with the synchronization signal block.

17. The non-transitory machine-readable medium of claim 15, wherein the channel state data is configured in accordance with the second network equipment.

18. The non-transitory machine-readable medium of claim 15, wherein the operations further comprise:
based on a link quality metric, generating, by the mobile device function, of the first network equipment, a request for aperiodic radio link management to indicate a timing configuration.

19. The non-transitory machine-readable medium of claim 15, wherein the operations further comprise:
in response to receiving a first request from a donor unit of the first network equipment to support a transmission state, generating, by the mobile device function, of the first network equipment, a request for aperiodic radio link management to indicate a timing configuration.

20. The non-transitory machine-readable medium of claim 15, wherein the operations further comprise:
facilitating connecting the mobile device function, of first network equipment, to second network equipment.

\* \* \* \* \*